United States Patent [19]
Bradford

[11] Patent Number: 5,843,313
[45] Date of Patent: *Dec. 1, 1998

[54] FUEL FILTER

[75] Inventor: Peter Francis Bradford, Sudbury, United Kingdom

[73] Assignee: Lucas Industries Public Limited Company, Solihull, United Kingdom

[*] Notice: The term of this patent shall not extend beyond the expiration date of Pat. No. 5,665,230.

[21] Appl. No.: 519,818

[22] Filed: Aug. 25, 1995

[30] Foreign Application Priority Data

Sep. 2, 1994 [GB] United Kingdom .................. 9417607

[51] Int. Cl.⁶ .................................................. B01D 35/02
[52] U.S. Cl. .......................... 210/305; 210/439; 210/440; 210/455
[58] Field of Search .................................. 210/305–308, 210/311, 320, 439, 440, 455, 456, 484, 493.4, 497.7, DIG. 5, 446, 483, 309

[56] References Cited

U.S. PATENT DOCUMENTS

| | | | |
|---|---|---|---|
| 1,872,430 | 8/1932 | Ericson | 210/439 |
| 2,052,540 | 8/1936 | Delano | 210/456 |
| 3,105,042 | 9/1963 | Roosa | 210/439 |
| 3,662,895 | 5/1972 | Tuffnell et al. | 210/439 |
| 4,512,884 | 4/1985 | Wheatley . | |

FOREIGN PATENT DOCUMENTS

| | | |
|---|---|---|
| A-0 400 223 | 12/1990 | European Pat. Off. . |
| A-0 547 951 | 6/1993 | European Pat. Off. . |
| 579484A1 | 1/1994 | European Pat. Off. . |
| 2548920 | 1/1985 | France . |
| 47-4395 | 2/1972 | Japan .................................. 210/497.1 |
| 886 623 | 8/1960 | United Kingdom . |
| 867004 | 5/1961 | United Kingdom . |
| 936361 | 9/1963 | United Kingdom . |
| 1091587 | 11/1967 | United Kingdom . |

Primary Examiner—Mathew O. Savage
Attorney, Agent, or Firm—Ostrolenk, Faber, Gerb & Soffen, L.L.P.

[57] ABSTRACT

A fuel filter element includes an outer casing within which is located an annular filter medium which surrounds an inner tube. The filter medium is supported by upper and lower annular support plates. The upper support plate is provided with apertures to allow fuel flow and the lower support plate has a series of apertures which are located adjacent the outer peripheral edge of the plate.

12 Claims, 2 Drawing Sheets

FUEL FILTER

This invention relates to fuel filter elements of the kind having an outer casing, an inner tube which extends within the casing, a filter medium which is located between the outer wall of the tube and the inner wall of the casing and upper and lower annular support plates which extend between the casing and the tube at their upper and lower ends respectively to support the filter medium, the plates being apertured to allow fuel flow through the filter medium.

Such filter elements are well known in the art and have two forms one being where in use, the element is clamped between upper and lower housing parts. The upper housing part defines a fuel inlet connection and a fuel outlet connection and the lower housing part defines a bowl which affords communication between the lower end of the tube and the apertures in the lower support plate. The two housing parts and the filter element are clamped by a central bolt which extends with clearance through the tube. The upper housing part defines an annular chamber open to the apertures in the upper support plate and communicating with one of said connections. In addition the upper housing part defines a central spigot which locates in sealing relationship in the upper portion of the tube, the spigot being hollow and communicating with the other of said connections. The other form of element is for use where the element is in screw thread engagement or is otherwise secured to a housing part which is similar to the aforesaid upper housing part, the role of the lower housing part being effected by a bowl portion which is an integral part of the casing of the element.

In the use of such an element the central tube may be connected to the inlet connection so that the fuel flows upwardly through the filter medium. In this case droplets of water contained in the fuel tend to separate from the fuel as it passes between the lower end of the central tube and the lower end of the filter medium. The droplets of water collect in the lower portion of the bowl. As an alternative the central tube may be connected to the outlet connection and in this case the droplets of water pass through the filter medium but again separate from the fuel and collect in the lower portion of the bowl, during the passage of the fuel between the lower end of the filter medium and the lower end of the central tube.

In one known construction the lower support plate has been provided with circular rows of apertures at different radii from the longitudinal axis of the element and in another known construction the lower support plate has been provided with a plurality of radial slots spaced about the axis of the element.

It is desirable that the separation of water from the fuel should be as efficient as possible in order to minimise rust formation in the components of the engine fuel system of which the filter element forms part, downstream of the filter element. Such components may comprise a high pressure fuel injection pump incorporating steel parts machined to a high degree of accuracy and having very small working clearances. It is therefore an object of the invention to provide a filter element of the kind specified in a form in which the separation of water from the fuel is enhanced.

According to the invention in a filter element of the kind specified the apertures in the lower support plate are located adjacent the outer peripheral edge of the plate.

Examples of filter element in accordance with the invention will now be described with reference to the accompanying drawings in which:

BRIEF DESCRIPTION OF THE DRAWINGS

Referring to FIG. 1 of the drawings the filter element comprises an outer casing 10 which includes an integral bowl portion 11. A step is defined at the junction of the casing and the bowl portion which supports a lower support plate 12 which is of annular form having a central aperture defined by an upturned lip 13. The lip locates a central tube 14 which extends to the open upper end of the casing. Interposed between the outer peripheral surface of the tube and the inner surface of the casing is an annular filter medium 15 which conveniently is formed from at least two strips of filter paper wound about the tube 14, the longitudinal edges of the paper being coated on one side so that as winding takes place, a series of pockets generally of V-shape in cross section, are formed. At the upper end of the filter medium is located an apertured upper support plate 16. In use, the element is secured to a housing (not shown), the housing including a depending spigot which locates in the upper portion of the central tube 14 and the housing defining an annular space connected to a fuel inlet, the space communicating with the apertures in the upper support plate. The spigot is provided with a passage connected to a fuel outlet and in use, fuel flows downwardly through the filter medium. In accordance with the invention the lower support plate has a series of apertures 17 located adjacent its outer peripheral edge and adjacent the inner surface of the casing so that the fuel and any water contained within the fuel flows through the apertures 17 into the space defined by the bowl each aperture defines a bore having an axis generally parallel to that of the central tube 14. The fuel then flows upwardly through the central tube 14. Droplets of water contained in the fuel such as indicated at 18, tend to collect in the lower portion of the bowl so that the fuel as it flows upwardly through the tube 14 is substantially free of water. The apertures 17 since they are positioned adjacent the outer peripheral surface of the lower support plate ensure that the fuel in its passage through the space defined by the bowl has as long a distance to travel as possible thereby ensuring that the majority of the water droplets fall towards the bottom of the bowl.

Figure 1:
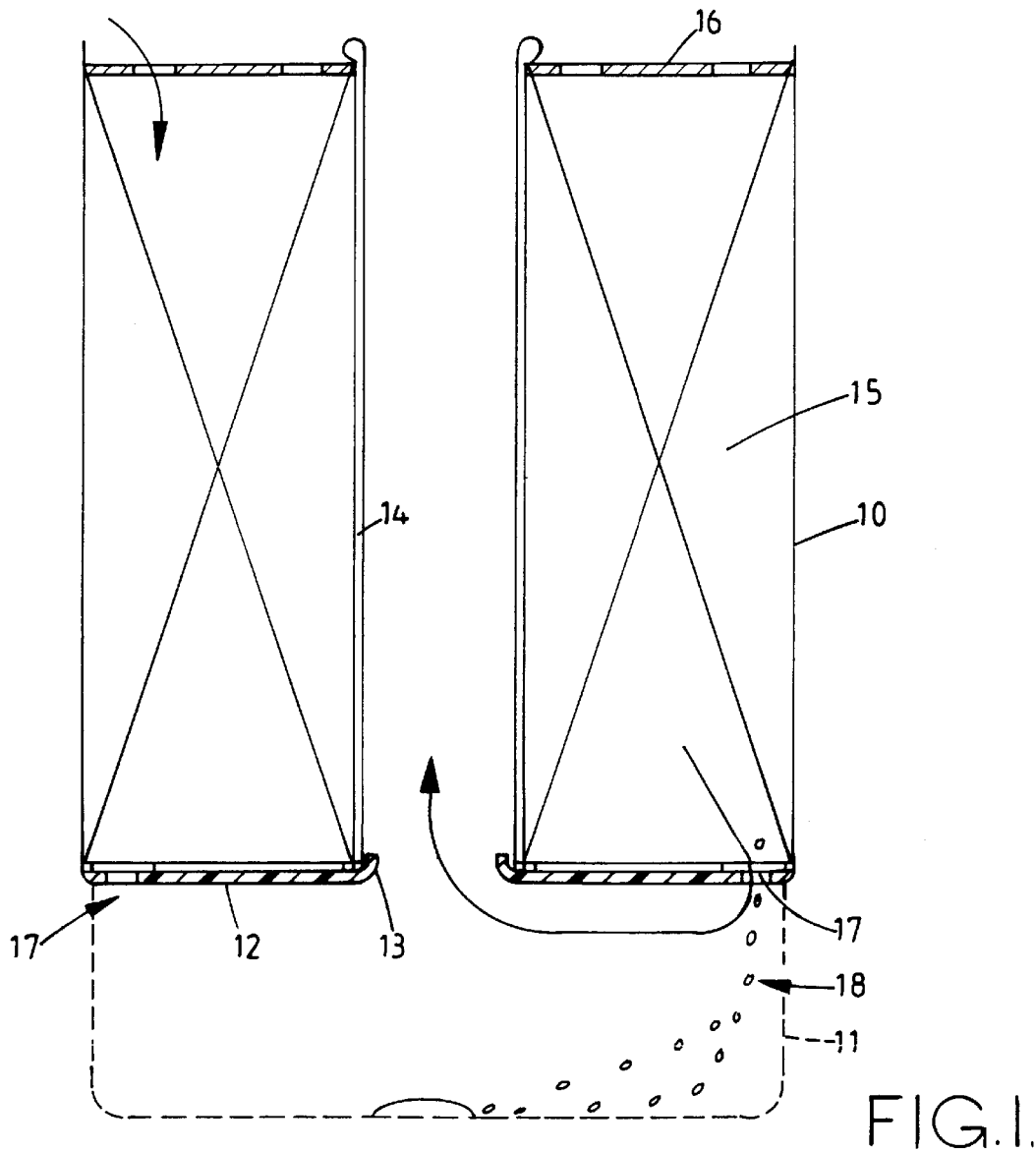
FIG. 1 is a diagrammatic sectional side elevation of one example of the element.
Figure 2:
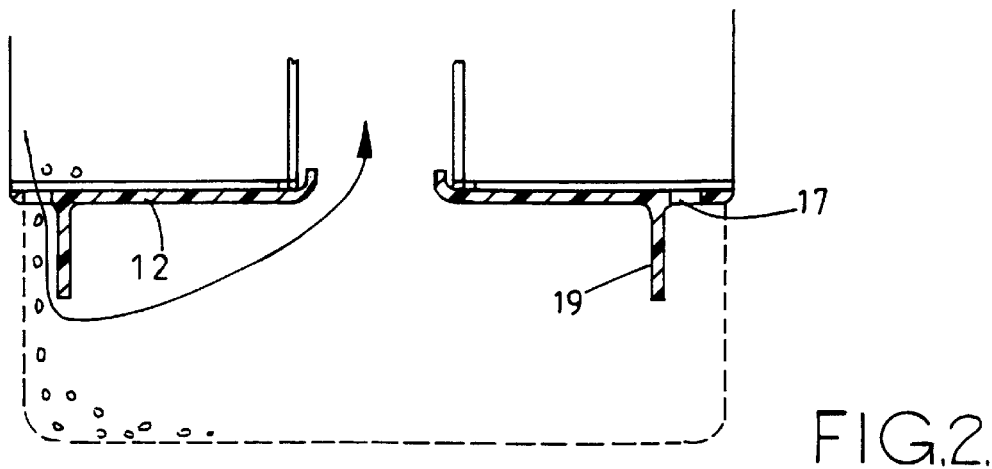
FIG. 2 is a view similar to FIG. 1 showing a modification of the element in FIG. 1.

In the modification shown in FIG. 2 an annular depending baffle 19 is mounted on the lower support plate and is located inwardly of the apertures 17. The presence of the baffle assists the separation of the water from the fuel.

Figure 4:
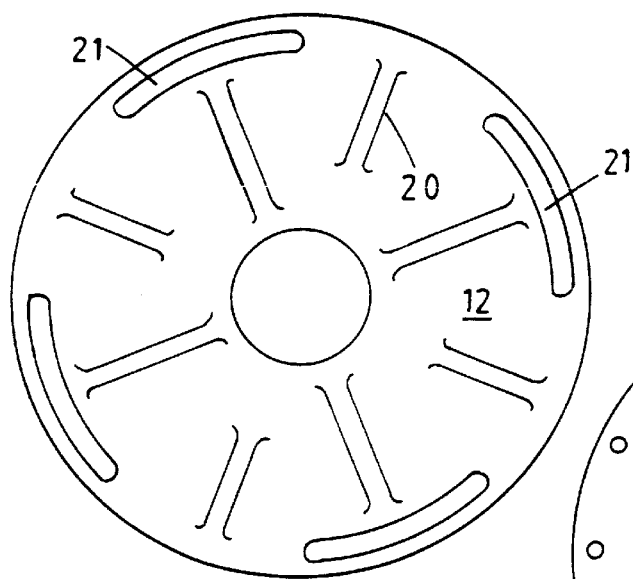
FIGS. 4 and 5 are plan views of support plates for incorporation in the elements shown in the previous Figures.
Figure 5:
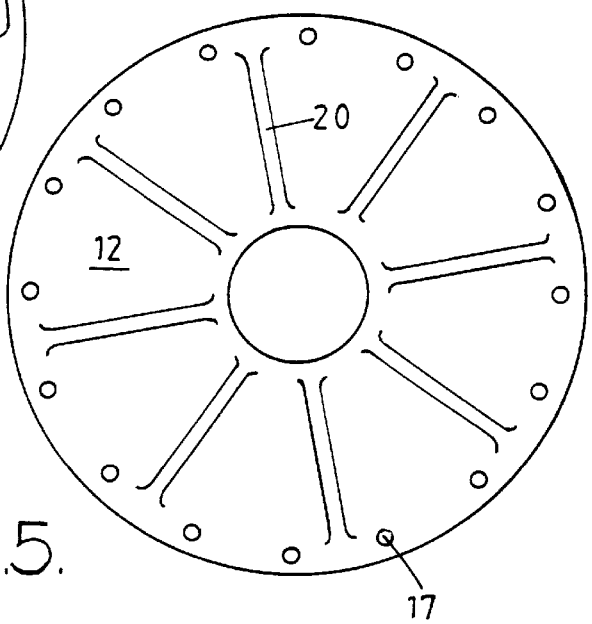

As will be seen from FIGS. 4 and 5 the upper surface of the lower support plate is provided with radial ribs 20 which space the lower edges of the filter medium from the upper surface of the support plate. The fuel as it passes through the filter medium flows outwardly along the spaces defined between the ribs. In FIG. 4 there is shown an alternative to the apertures 17 the alternative being a series of arcuate slots 21 which are located adjacent the outer periphery of the support plate.

Figure 3:
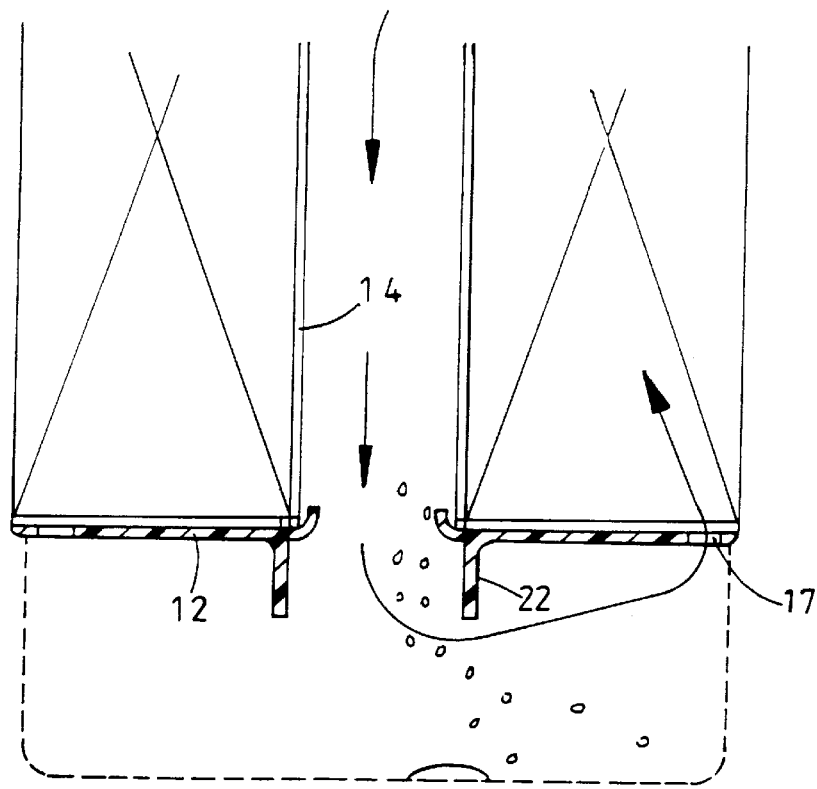
FIG. 3 is a view similar to FIG. 1 showing another example of the element.

In the example shown in FIG. 3 the direction of fuel flow through the element is reversed so that the fuel flows down the central tube into the bowl and during its passage to the openings 17, the water separates from the fuel to collect as previously described in the bowl. Conveniently an annular baffle 22 is provided which surrounds the central opening in the lower support plate, this baffle having a similar effect to the baffle shown in FIG. 2.

I claim:

1. A fuel filter element comprising a tubular casing surrounding a central axis and having an upper part, and a lower part which includes a bowl, the tubular casing having an inner wall surface, a tube having opposite upper and lower ends and having an outer wall surface, the tube extending axially within the casing, said casing and tube defining an annular space between them, an annular filter medium located in said annular space, and upper and lower annular support plates extending between the casing and the tube adjacent said upper and lower parts of said casing respectively, said support plates being apertured to allow fuel flow through said support plates and through the filter medium, the apertures in the lower support plate being located only adjacent the outer peripheral edge of the lower support plate and proximate said inner wall surface of the casing, said lower support plate having an upper surface, a plurality of ribs extending upward from the upper surface of said lower support plate, wherein said ribs include upper ends that are in contact with a lower surface of the filter medium for spacing the lower surface of the filter medium upward from said upper surface of said lower support plate.

2. A fuel filter element according to claim 1, wherein said apertures are located radially intermediate radially outer ends of said ribs and the outer peripheral edge of said support plate.

3. A fuel filter element according to claim 1, wherein said apertures are circular.

4. A fuel filter element according to claim 1, wherein said apertures are arcuate slots.

5. A fuel filter element according to claim 1, wherein the outer peripheral edge of said lower support plate is supported on a step formed at a juncture between the lower part of said casing and said bowl.

6. A fuel filter element according to claim 1, wherein radially inner ends of said ribs are spaced apart from the outer wall surface of said tube.

7. A fuel filter element according to claim 1, wherein said lower support plate includes an up-turned lip that extends into an interior portion at the lower end of said tube.

8. A fuel filter element according to claim 1, wherein a lower surface of said lower annular support plate includes an annular baffle extending downwardly therefrom.

9. A fuel filter element according to claim 8, wherein said annular baffle is proximate a radially innermost side of said apertures.

10. A fuel filter element according to claim 9, wherein said annular baffle is proximate a central aperture of said lower support plate.

11. A fuel filter element according to claim 1, wherein said ribs include major axes that extend outwardly from said central axis.

12. A fuel filter element according to claim 1, and wherein said ribs include major axes that extend generally radially outwardly from said central axis.

* * * * *